Aug. 9, 1960                 P. C. HUTTON                 2,948,502
                            RESILIENT SUPPORTS
Filed Oct. 26, 1956                                    5 Sheets-Sheet 1

INVENTOR
PHILIP C. HUTTON

BY
   ATTORNEYS

Aug. 9, 1960  P. C. HUTTON  2,948,502
RESILIENT SUPPORTS

Filed Oct. 26, 1956  5 Sheets-Sheet 3

INVENTOR
PHILIP C. HUTTON

BY *[signature]*
ATTORNEYS

INVENTOR
PHILIP C. HUTTON

ATTORNEYS

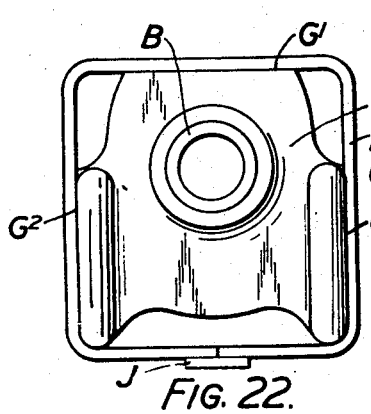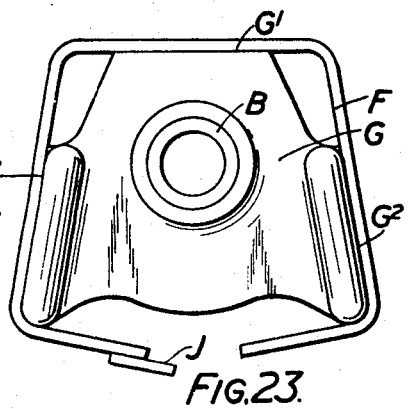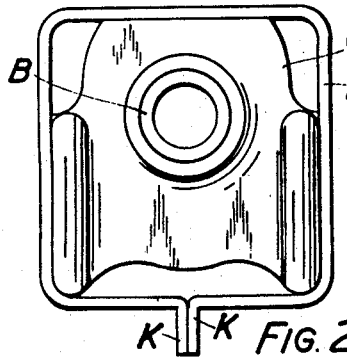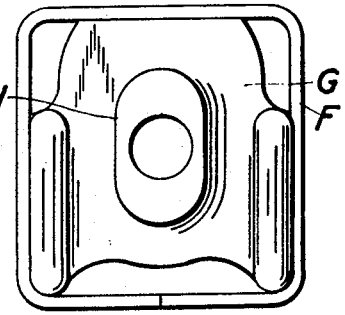

United States Patent Office 2,948,502
Patented Aug. 9, 1960

2,948,502

RESILIENT SUPPORTS

Philip Charles Hutton, Crawley, England, assignor to Silentbloc Limited, Crawley, England, a company of Great Britain Filed Oct. 26, 1956, Ser. No. 618,541

Claims priority, application Great Britain Jan. 27, 1954

12 Claims. (Cl. 248—358)

This invention relates to resilient supports of the kind comprising a comparatively rigid tubular outer member or socket, an inner member lying within and spaced from the surface of the bore of the outer socket and an intermediate member of rubber or like flexible resilient material lying in the space between the inner member and socket and caused to adhere to both these parts either by bonding or frictionally, or mechanical interlocking.

An object of the invention is to provide a support of the above kind which will lend itself to production in quantity and can readily be produced with a wide variety of dimensions for the different parts, thus enabling a wide variety of degrees of resilience in various directions to be obtained by adopting appropriate dimensions while being generally suited to its purpose.

A further object is to improve the intermediate member by causing its rate of resistance to deformation to change with increasing deflection, thereby limiting movements due to excessive overloads or vibration, and making it possible to design a mounting of small size and convenient form, as compared with a conventional mounting having rate of resistance to deformation independent of the deflection.

A resilient support according to the present invention comprises a tubular outer member or socket of approximately constant internal cross section throughout its length formed of relatively rigid material, an inner member of approximately constant external cross-section throughout its length lying within and extending in the direction of the length of the socket and spaced from the wall of the socket, and a tubular intermediate member of resilient flexible material interposed between the inner and outer members, the inner member lying closely within and being connected by bonding or frictionally to the bore of the intermediate member while the cross sectional forms of the intermediate member and socket are such that the intermediate member and socket have three areas of contact only, spaced from one another about the axis of the socket with the first area of contact opposite the space between the second and third areas of contact, the intermediate member being compressed within the socket by pressure applied through said areas of contact.

In a preferred arrangement the line joining the centre of the first area of contact to the centre of the space between the said second and third areas of contact passes through the axis of the inner member.

For convenience the length of the socket will be considered to be the distance between the ends of its bore, and the axis of the support will herein be assumed to be the straight line which extends along the centre of the bore of the socket, i.e. through the points constituting the central points in the cross sectional area of the bore of the socket in planes at right angles to its length. It has also for convenience herein been assumed that the area of contact referred to as the upper area of contact is adjacent to the top of the socket, since the support would usually be arranged to carry a main vertical gravitational load applied to the inner member with the support disposed with the area referred to at the top, although in some cases the load might be applied in a direction other than vertically downwards in which case the support would usually be arranged with the area in question disposed in the part of the socket lying nearest to the direction from which the main load is applied to the inner member.

In some cases the intermediate member may be bonded to the socket and/or the inner member in which case it will preferably in addition be compressed between the socket and the inner member, while in other cases the surfaces of the intermediate member, the inner member and the socket may be caused to grip one another over their areas of contact by friction alone by reason of the compression of the intermediate member between the socket and the inner member, usually assisted in the case of the inner member, by the intermediate member being somewhat stretched by the insertion of the inner member into its bore in the intermediate member.

In any case the socket may be formed or arranged to provide rib-like shoulders constituting axially extending abutments lying immediately adjacent to the lower edges of the two lower areas of contact so as to be engaged by edge portions at the lower edges of the two lower areas of contact of the intermediate member.

The form of the socket, of the intermediate member and of the inner member may vary considerably and various typical forms of resilient support according to the invention will now be described by way of example with reference to the accompanying drawings in which Figures 1 and 2 are respectively an end view and an axial sectional view in the vertical plane of a typical support embodying the invention;

Figure 6:
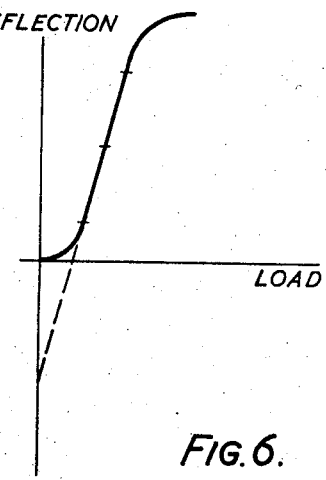
Figure 6 is a graph illustrating the relationship between load and deflection of a typical form of the invention.
Figure 7:
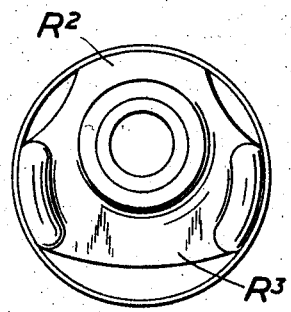
Figure 8:
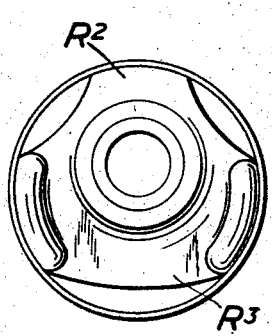
Figure 9:
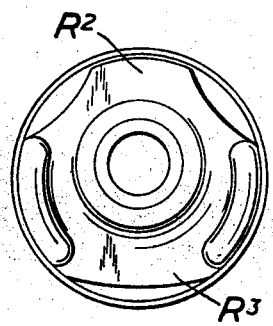
Figure 10:
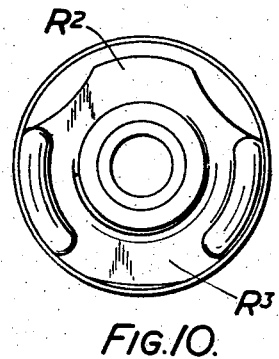
Figure 11:
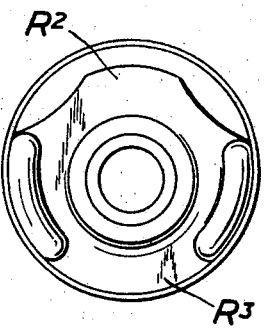
Figure 12:
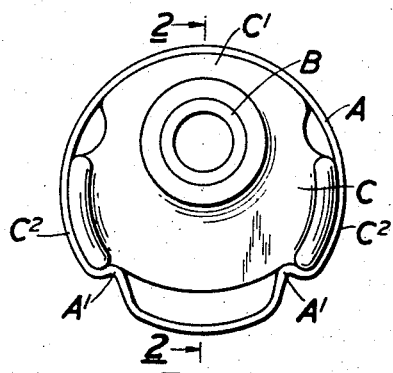
Figure 13:
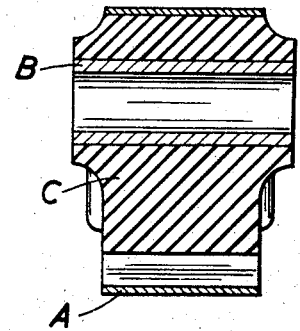
Figure 14:
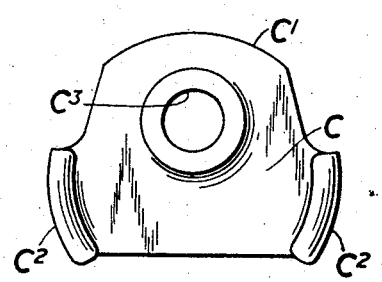
Figure 15:
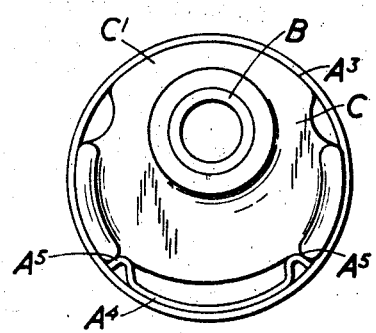
Figure 16:
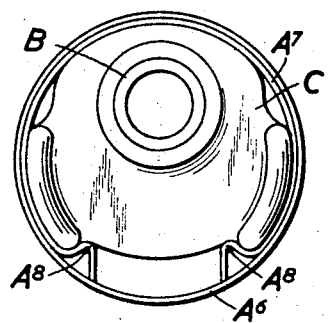
Figure 17:
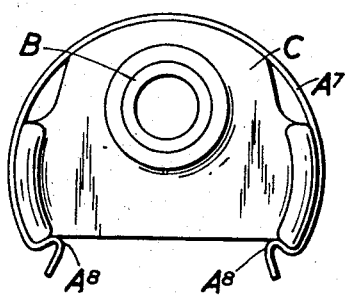
Figures 18, 19:
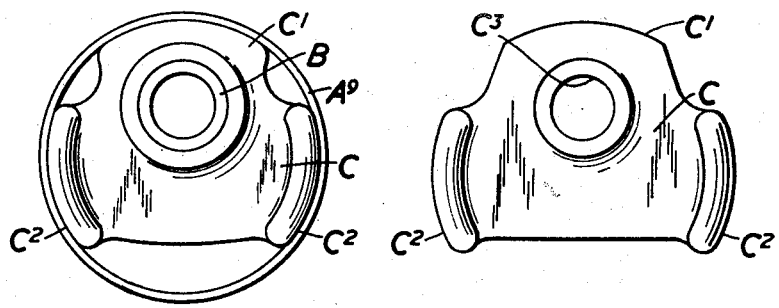
Figures 20, 21:
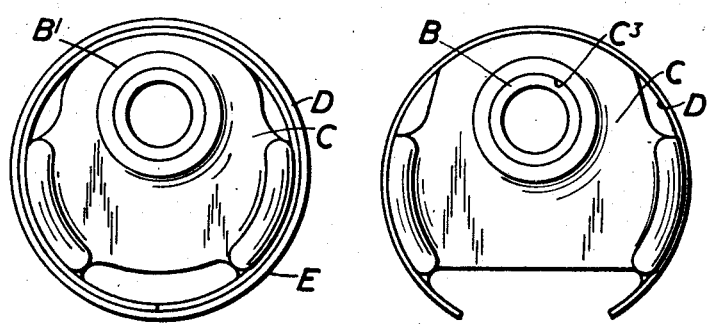

Figures 7 to 11, inclusive, are end views illustrating the changes in shape of a support embodying one form of the invention as the vertical load thereon is increased in the manner shown in Figure 6;

Figure 12 is an end view of a preferred form of support according to the invention;

Figure 13 is a cross section on the line 2—2 of Figure 12;

Figure 14 shows the form of the intermediate member used in the construction shown in Figures 12 and 13 in its undistorted state before assembly;

Figure 15 is an end view showing a modification of the construction shown in Figures 12, 13 and 14;

Figures 16 and 17 are end elevations showing a further modification of the construction shown in Figures 12, 13 and 14;

Figures 18 and 19 show a form of support according to the invention in which the intermediate member is bonded to the inner member and lower contact areas of the socket;

Figures 20 and 21 show an alternative form of support according to the invention with the intermediate member bonded to the inner member and the lower areas of contact of the socket and how it may be made;

Figures 22 and 23 show another form of support according to the invention and a method of making it;

Figure 24 shows a modification of the support shown in Figures 22 and 23, and

Figure 25 shows a further modification of the support shown in Figures 22 and 23.

Preliminary to describing the several illustrative forms of the invention in detail it is to be noted that all are of the three point contact type described in my British patent application No. 2555/54, filed January 27, 1954 (the corresponding United States patent application being Ser. No. 480,929 filed January 10, 1955, now abandoned, entitled Resilient Supports) wherein the shape and arrangement of the resilient intermediate member are such as to cause the "spring constant" (i.e. the force opposing deflection) to vary with changes in vertical load, thereby reducing the total deflection under dead load required for a given reduction of vibration damping.

The natural frequency W in radian per second for a linear one degree of freedom system is given by $$W = \sqrt{\frac{S}{M}}$$

where M is the vibrating mass and S is the spring constant.

To obtain good insulation by means of flexible mountings it is essential that the natural frequency is low compared with the disturbing vibration.

For a given mass M the only way of reducing the natural frequency is to reduce the spring constant S.

For a linear flexible mounting the smaller the value of S is, the greater will be the deflection of the mounting due to the supported dead weight and the greater will be the dimensions of the mounting.

Further incidental shocks, etc., applied to the vibrating system with a linear flexible mounting will tend to give excessive movements if the value of S is very low.

The purpose of the present mounting design is to provide a flexible mounting of relatively small size and convenient form which will give a relatively low spring-constant S for a load range which reaches from somewhat below to somewhat above the normal dead load which is to be supported. Further the design is such that for load values greater or smaller than the above mentioned load range the value of the spring constant is appreciably increased. By this means the total deflection due to dead load can be reduced to a reasonable figure and the dimensions of the mounting can be kept small.

Besides the above further advantages can be obtained which will be described later.

Figure 1:
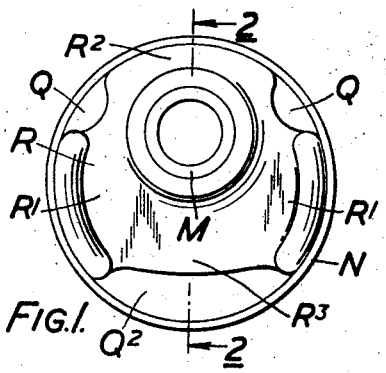
Figure 2:
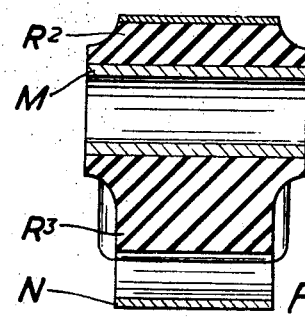

In the typical form of the invention shown in Figs. 1 and 2, the support comprises a tubular inner spindle member M having its axis horizontally arranged parallel to and preferably somewhat above the axis of the cylindrical outer socket member N, the space between these members, which are preferably made of a rigid material such as mild steel, being of variable width and partially filled by a compressible tubular bushing R made of tough resilient materal such as rubber. The bushing has a bore extending through it from face to face of slightly smaller diameter than the outside diameter of the spindle M, so that when the spindle is forced through the bore in the bushing and both spindle and bushing are forced into the socket member the bushing is both stretched circumferentially and compressed radially to embrace the spindle tightly enough to prevent any rotation or relative movement of one with respect to the other.

The outer circumference of the bushing is provided with a pair of recesses Q, one on each side of the principal vertical plane of the bushing, these recesses extending for a short distance around the circumference of the bushing away from its middle top region where it is in contact with the inner wall of the outer socket. The bushing also has a recess in its lower circumference providing a space $Q^2$ between it and the lower part of the outer socket member in its normal compressed state when not under load.

For convenience in explaining the action of the support under load, the rubber in the mounting can approximately be considered as consisting of three parts which provide three separate spring constants.

The two rubber parts designated by $R^1$ and which carry load approximately in shear provide a comparatively low spring constant $S^1$.

The rubber designated by $R^2$ is not bonded or cemented to the outer sleeve. This rubber can take load in compression only, and with the preferred design, the spring constant $S^2$ due to this rubber in compression is comparatively high; as this rubber part can carry no tension due to omission of bond with the outer tube the tensional spring constant is nil.

In the preferred design the rubber proportions are such that when the mounting carries no load the rubber represented by this area $R^2$ is in compression. This compressed load is counterbalanced by an equal but opposite load on the rubber represented by $R^1$, and taken by this mainly in shear.

The rubber represented by $R^3$ does not contact the outer tube until the mounting is deflected by a load in excess of the normal dead load carried by the mounting. When the rubber $R^3$ contacts the outer tube it acts mainly in compression and it provides a spring constant $S^3$ which in the preferred design has a comparatively high value.

Figure 3:
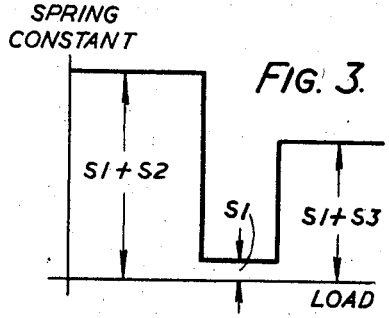
Figures 3, 4 and 5 are diagrams illustrating the relationships between spring resistance and deflection of a vibrating mass upon which the invention is based.

A diagram Fig. 3 of the total spring constant for the mounting can now be drawn.

Initially at low loads the spring constant is due to the coaction of the rubber parts $R^1$ and $R^2$ giving a total spring constant of $S1+S2$.

As the load increases above a figure determined by the details of the design the rubber part $R^2$ moves clear of the outer tube and the spring constant for the mounting is now due to the rubber parts $R^1$ giving a total spring constant $S1$.

Figure 4:
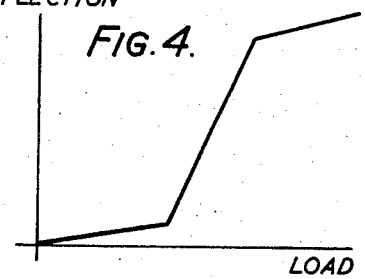

If the load is further increased the rubber part $R^3$ will, at a load depending on design details, contact the outer tube. Under this condition the spring constant will be due to co-action of the rubber parts $R^1$ and $R^3$ and the total spring constant for the mounting will be $S1+S3$. From the spring constant diagram a deflection diagram corresponding can be drawn as shown in Figure 4.

Figure 5:
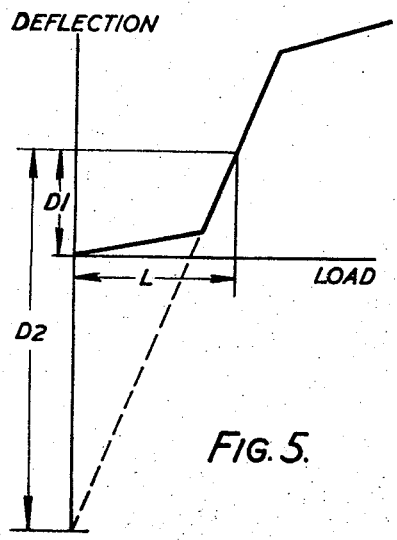

In Fig. 5 the actual deflection D1 due to the dead load L is indicated. As compared to this the actual deflection of a linear mounting with a spring constant equal to S1 is indicated by D2. Figure 6 illustrates in graphical form the deflection/load characteristics of a typical form of the invention, and Figures 7 to 11 show the progressive change of shape of the mounting as the vertical load is increased.

It will be seen that the improved design of mounting can provide a low value of spring constant with a compartively small deflection.

In the usual or preferred design the rubber will be shaped so as to avoid very sharp transition points as these are not desirable, and it will be appreciated that in order to obtain the deflection curves of Fig. 6 the width of the space $Q^2$ must be greater than the diameter of the inner member M, as shown in all of the figures illustrating the various embodiments of the invention.

The foregoing discussion has been based on a one degree of freedom system, but similar conditions apply for the more general flexible mounting problem and the mounting design is just as advantageous for such cases. In fact two further features should be mentioned in this connection.

Apart from the above outlined vertical characteristics of the flexible mounting it is often desirable that the mounting has a low value spring constant in one approximately horizontal direction and a high value of spring constant in a second horizontal direction at right angles to the first. This condition is satisfied by the present design. Radially in a horizontal direction the spring constant is high and axially the spring constant is low.

In the construction shown in Figures 12 and 13 the support comprises a tubular outer member or socket A of the cross sectional form shown in Figure 12 formed to provide within its bore two parallel rib-like abutments $A^1$ extending longitudinally thereof, a cylindrical inner member B lying within the socket and an intermediate member C of rubber or the like of the cross sectional form shown lying in the space between the socket A and inner member B with the inner member B disposed within a bore therein.

As will be seen the bore of the socket A is approximately cylindrical except for the abutments $A^1$ while the intermediate member C has an external surface which comprises three part-cylindrical surface areas (herein called contact areas) consisting of an upper part-cylindrical contact area $C^1$ and two lower part-cylindrical contact areas $C^2$, with the parts of the intermediate member C immediately below the contact areas $C^2$ formed to engage the abutments $A^1$.

The intermediate member C before it is assembled with the socket A and inner member B, that is to say in its undistorted state, has the cross sectional shape shown in Figure 14, from which it will be seen that the bore $C^3$ into which the inner member B is inserted is of smaller diameter than this inner member so that it is stretched by such insertion, while the diameter of the imaginary cylinder of which the areas $C^1$, $C^2$ form parts is greater than that of the bore of the socket A so that the intermediate member C is radially compressed in the assembled support, whereby the surfaces of the contact areas of the intermediate member in engagement with the inner member and socket are caused to adhere frictionally to the surfaces of the inner member and socket with which they engage.

It will be seen that the axis of the bore $C^3$ lies substantially above the axis of the cylindrical surfaces $C^1$, $C^2$ and that, while the compression force exerted through the surface of the contact area $C^1$ on the intermediate member C is mainly downwards, the compressive forces exerted on this member through the surfaces of the contact areas $C^2$ is mainly horizontal, although with an upward component.

When the support is loaded by connecting the inner member B to a load, as by a bolt passing through the inner member, and mounting the socket A on a suitable supporting structure, it will be seen that the inner member B will move downwards under the influence of the load and, as it does so will approach the area lying horizontally between the contact areas $C^2$, and it is found that by selecting suitable dimensions for the parts and a suitable degree of compression of the intermediate member and positioning of the bore for the inner member B therein, it is possible to provide supports of the form indicated having a wide variety of degrees of resilience and wide variety of numerical ratios relating downward movement of the inner member to increases in load.

In the modification shown in Figure 15 the construction would be generally the same as in Figures 12 and 13 except that the outer member $A^3$ which corresponds to A in Figures 12 and 13, is completely cylindrical and has an insert $A^4$ arranged therein to provide abutments $A^5$ corresponding to the abutments $A^1$ in the construction shown in Figures 12 and 13.

In the modification shown in Figures 16 and 17 the general form of the intermediate member C, the inner member B and the contact areas of the socket with which the intermediate member C engages, are the same as in Figures 12 and 13. In the construction shown in Figures 16 and 17 however, the socket comprises a completely cylindrical outer part $A^6$ within which is inserted a generally U-shaped inner part $A^7$ formed to provide abutments $A^8$ corresponding to the abutments $A^1$ in the construction shown in Figures 12 and 13. Initially the intermediate member C in this arrangement has approximately the same form as in Figure 14 but it is inserted within the part $A^7$, which at this stage is as shown in Figure 17 in an expanded state so that the member C fits easily within it.

The part $A^7$ is then compressed and inserted into the part $A^6$, thus compressing the intermediate member C. With this arrangement the lower areas of contact of the intermediate member C may or may not be bonded to the part $A^7$ before insertion into the part $A^6$.

In the construction shown in Figure 18 the parts of the support are of the same general form as in Figures 12 and 13 except that the socket is of complete cylindrical form as shown at $A^9$ without any abutments thereon. In this case the intermediate member, which as shown in Figure 19 would in its undistorted state have the same general form as that in Figure 14, is compressed and inserted into the socket $A^9$ after being coated with a bonding agent which unites the surfaces $C^2$ firmly to the socket after insertion. The inner member B would preferably also be similarly united to the surface of the bore $C^3$.

In the modification shown in Figures 20 and 21, the construction is generally similar to that shown in Figures 18 and 19 except that the lower areas of contact of the intermediate member C instead of being bonded direct to a complete cylindrical socket, are bonded to a U-shaped member D while in a substantially undistorted state, after which the member D is compressed and inserted into a cylindrical socket E.

In the construction shown in Figures 22 and 23 the support, as shown in Figure 22, comprises a socket F of substantially square cross-section, an inner member B of cylindrical form and an intermediate member G of rubber or the like having an upper contact area $G^1$ in close engagement with the upper wall of the socket, and two lower contact areas $G^2$ in close engagement with the lower parts of the side walls of the socket, the lower edges of the sides of the intermediate member G bearing against abutments formed by the lower corner portions of the socket F.

Initially the socket F in this construction is formed as shown in Figure 23, while the form of the intermediate member G is also as shown in this figure, the member G being placed in the socket as shown and if desired its lower areas of contact united to it by a bonding compound. The socket F is then close up into the form shown in Figure 22, the adjacent edges being united by any convenient means such as spot welding a connecting plate J to them as shown in Figures 22 and 23, providing them with flanges K which are riveted or spot welded to one another as shown in Figure 24 or otherwise.

In the modification shown in Figure 25 the construction of the support is substantially the same as in Figure 22 but the inner member, instead of being externally cylindrical is externally of elongated cross section as shown at H, thus modifying the variations in the ratios relating load to relative movement between the inner member and socket when operating under a varying load.

It will be readily understood that constructions shown in the drawings are given by way of example only and that the constructional details of supports according to the invention may vary widely to suit requirements without departing from the invention.

This application is a part continuation of and substitute for my pending U.S. application Serial No. 480,929, filed January 10, 1955, now abandoned, for Resilient Supports.

What I claim as my invention and desire to secure by Letters Patent is:

1. A resilient support having a lower spring constant for a predetermined normal load than for larger and smaller loads, said support comprising a tubular outer socket member of approximately constant internal cross-section formed of relatively rigid material, an inner member of approximately constant external cross-section lying within and extending in the direction of the length of the socket and spaced from the wall of the socket, and a tubular intermediate member of resilient flexible material interposed between the inner and outer members, the inner member lying closely within the bore of the intermediate member, said intermediate member and socket having first, second and third areas of contact only, spaced from one another about the axis of the socket with the first area of contact opposite the space between the second and third areas of contact, the intermediate member being compressed within the socket by pressure applied through said areas of contact but separable from said outer member at said first area of contact when urged away therefrom, and the second and third areas of contact on said intermediate member being circumferentially spaced from each other by a distance greater than the diameter of said inner member and connected by a cushion of said resilient material opposite said first contact area, which cushion is spaced from said outer member when said support is unloaded.

2. A resilient support as claimed in claim 1, in which the line joining the center of the first area of contact to the center of the space between the said second and third areas of contact passes through the axis of the inner member.

3. A resilient support as claimed in claim 2, in which the socket provides axially extending inwardly facing shoulders immediately adjacent to the edges of the said second and third areas of contact remote from the said first area of contact whereby the flexible resilient material adjacent to said lower edges engages said shoulders.

4. A resilient support as claimed in claim 3, in which the socket comprises a member having a cylindrical bore and the said shoulders are formed by the edge portions of an inserted member extending around the part of the bore of said member which lies on the side of the said second and third areas of contact remote from the said first area of contact.

5. A resilient support as claimed in claim 1, in which the said intermediate member and the said socket are bonded to one another over the said areas of contact.

6. A resilient support as claimed in claim 1, in which the bore of the socket is of quadrilateral form and two adjacent corners of the quadrilateral form axially extending shoulders which are engaged by the two adjacent edges of said second and third areas of contact which lie remote from said first area of contact.

7. A resilient support as claimed in claim 1, in which the inner member is externally cylindrical and lies, when the support is unloaded, with its axis substantially to the side of the axis of the socket adjacent to the said first area of contact.

8. A resilient support as claimed in claim 7, in which the line joining the center of the first area of contact to the center of the space between the said second and third areas of contact passes through the axis of the inner member.

9. A resilient support comprising a tubular outer socket member of relatively rigid material, an inner spindle member of relatively rigid material lying within and extending lengthwise of the socket member, the socket and spindle members being spaced apart throughout their lengths, and a tubular intermediate member of resilient flexible material having an axial bore to receive the spindle member interposed between the spindle and socket members, the spindle member being tightly secured within said bore and said intermediate member being compressed between said spindle and socket members to engage the latter along at least three separate areas of contact spaced apart circumferentially around said support, the exterior shape of the intermediate member relatively to the interior shape of the socket member providing open spaces between said areas of contact separating said members from each other, one of said open spaces in the normal unloaded position of the support being at the lower side of said intermediate member and diametrically opposite an area of contact with the socket member at its upper side, the other two areas of contact on said intermediate member being circumferentially spaced from each other by a distance greater than the diameter of said spindle and connected by a cushion of said resilient material opposite said first contact area, which cushion is normally spaced from said outer member, the weight of the load as it is applied reducing the compression in the intermediate member adjacent to said upper contact area and causing the weight to be carried on the other areas of contact until said load forces said spindle down sufficiently to compress said cushion against said socket member.

10. A resilient support as claimed in claim 9 wherein the outer socket member is formed in the two parts, a rigid outer part encompassing the entire support and a flexible inner part encompassing the flexible intermediate member and adapted to be squeezed therewith into said outer part.

11. A resilient support as claimed in claim 9 wherein the intermediate member between the spindle and the upper contact area and socket member is under an initial compression so that it expands and retains its upper area of contact against the inner circumference of the socket member as the latter moves downwardly with respect to the socket member under light load weight, but the deflection of the spindle member with respect to the socket member under normal load weight separates the upper contact area of the intermediate member from contact with the inner circumference of the socket member and reduces the spring constant of the support to that of the other areas of contact.

12. A resilient support as set forth in claim 9 having a variable spring constant which is higher under no load and overload conditions than under normal load conditions.

References Cited in the file of this patent

UNITED STATES PATENTS

| | | |
|---|---|---|
| 2,004,712 | Thiry | June 11, 1935 |
| 2,049,024 | Robertson | July 28, 1936 |
| 2,143,739 | McCabe | Jan. 10, 1939 |
| 2,178,077 | Loftis | Oct. 31, 1939 |
| 2,509,145 | Henshaw | May 23, 1950 |